US008742949B2

(12) United States Patent
Chang

(10) Patent No.: US 8,742,949 B2
(45) Date of Patent: Jun. 3, 2014

(54) PARKING BARRICATE DEVICE WITH SENSING VEHICLE

(75) Inventor: Chun Ho Chang, Daegu-si (KR)

(73) Assignee: Keimyung University Industry Academic Cooperation Foundation, Daegu-Si (KR)

( * ) Notice: Subject to any disclaimer, the term of this patent is extended or adjusted under 35 U.S.C. 154(b) by 224 days.

(21) Appl. No.: 13/340,619

(22) Filed: Dec. 29, 2011

(65) Prior Publication Data

US 2013/0094902 A1 Apr. 18, 2013

(30) Foreign Application Priority Data

Oct. 17, 2011 (KR) ........................ 10-2011-0105815

(51) Int. Cl.

| | |
|---|---|
| ***B60Q 1/48*** | (2006.01) |
| ***G07C 5/08*** | (2006.01) |
| ***E01F 13/04*** | (2006.01) |
| ***G08G 1/017*** | (2006.01) |
| ***G08G 1/14*** | (2006.01) |

(52) U.S. Cl.

CPC *G08G 1/017* (2013.01); *G07C 5/08* (2013.01); *E01F 13/046* (2013.01); *G08G 1/143* (2013.01); *G08G 1/146* (2013.01); *G08G 1/149* (2013.01)

USPC ........................................ 340/932.2; 340/5.7

(58) Field of Classification Search

USPC ............... 340/932.2, 928, 933, 935, 5.7, 937; 404/6

See application file for complete search history.

(56) References Cited

U.S. PATENT DOCUMENTS

| | | | | |
|---|---|---|---|---|
| 4,325,146 | A * | 4/1982 | Lennington | 398/108 |
| 2012/0284209 | A1 * | 11/2012 | Duffy et al. | 705/418 |

* cited by examiner

*Primary Examiner* — Toan N Pham

(74) *Attorney, Agent, or Firm* — Revolution IP, PLLC

(57) ABSTRACT

A vehicle sensing parking barricade device includes: an RFID (Radio Frequency Identification) tag which is attached to a vehicle for identifying the vehicle; a barricade bar which limits entrance of the vehicle; an RFID reader which is installed in a portion of the barricade bar and receives information from the RFID tag to determine whether or not the vehicle is authenticated to be parked; and a motor driver which receives a signal from the RFID reader 25 to drive the barricade bar 10 to limit the vehicle entrance depending on the vehicle authentication.

8 Claims, 3 Drawing Sheets

PARKING BARRICATE DEVICE WITH SENSING VEHICLE

BACKGROUND OF THE INVENTION

1. Field of the Invention

The present invention relates to a parking barricade device, and more particularly, to a vehicle sensing parking barricade device which is capable of automatically and easily determining whether or not a vehicle is allowed to be parked and performing a security function for a parked vehicle.

2. Description of the Related Art

With advance of automobile industry and improvement of the living standards of people, automobile has been recognized as one of living necessaries and the number of automobiles has rapidly increasing in recent years. However, since parking spaces were limited compared to the rapidly increasing number of automobiles, a device to prevent an unauthorized vehicle from being parked was forced to come on.

Examples of existing parking prevention devices to prevent unlicensed parking of vehicles may include a tripodal parking ban indicator in the form of a thin board to erect in a parking space, a barricade formed of a steel pipe or the like, and so on. However, since these parking prevention devices were not firmly fixed in parking spaces and might be arbitrarily removed, they were not successful in full prevention of unlicensed vehicle parking.

To overcome this problem, there has been proposed a parking prevention device fixed to a parking space and including a vertically rotating parking preventer. In this proposed parking prevention device, the parking preventer is laid down for parking and is erected to prevent unlicensed vehicle parking.

However, the above parking prevention device has a problem that it is likely to be damaged due to an external force such as an impact of a vehicle on the erected parking preventer. In addition, electric wires have to be laid on to supply power to a motor rotating the parking preventer automatically, which may result in inactivation of the motor in the event of shut-off of power to the motor or other electric failures.

FIG. 1 is a perspective view of a conventional parking barricade. Referring to FIG. 1, an automatic parking protector 100 includes a body 110 and a parking preventer 120.

The body 110 is fixed to a parking space to prevent the body 110 from being arbitrarily removed from the parking space. Sides of the body 110 are inclined. Accordingly, even when vehicle tires step on the body 110 by mistake of a driver, the tires go over the body 110 naturally along the inclined sides of the body 110 without being caught by the body 110, thereby significantly reducing a risk of damage of the body 110 due to the driver's mistake.

The parking preventer 120 is installed in the body 110 in such a manner that the parking preventer 120 can be vertically rotated. Accordingly, the parking preventer 120 is downward rotated to be laid down for an authorized parking and is upward rotated to be erected against an unauthorized parking.

However, since the conventional parking barricade employs a manual switching system or a button type switching system, there is a problem of inconvenience that it requires manpower. In addition, in a case of on-street parking lot, there is a danger for a parked vehicle to be damaged by an outsider and there is a problem that no function of vehicle monitoring and security is provided.

SUMMARY OF THE INVENTION

To overcome the above problems, it is an object of the invention to provide a parking barricade device which is capable of automatically and easily determining whether or not a vehicle is allowed to be parked and allowing or restricting vehicle parking based on the determination.

It is another object of the invention to provide a parking barricade device with high security performance to prevent a parked vehicle from being damaged and secure an evidence useful to catch a criminal afterhand.

To achieve the above objects, according to one aspect of the invention, there is provided a vehicle sensing parking barricade device including: an RFID (Radio Frequency Identification) tag which is attached to a vehicle for identifying the vehicle; a barricade bar which limits entrance of the vehicle; an RFID reader which is installed in a portion of the barricade bar and receives information from the RFID tag to determine whether or not the vehicle is authenticated to be parked; and a motor driver which receives a signal from the RFID reader 25 to drive the barricade bar 10 to limit the vehicle entrance depending on the vehicle authentication.

Preferably, the barricade bar is vertically driven to limit the vehicle entrance, an LED lamp is formed in a portion of the barricade bar, and a solar cell system is installed on the top of the barricade bar to supply power to at least one of the RFID reader, the motor driver and the LED ramp.

According to another aspect of the invention, there is provided a vehicle sensing parking barricade device including: a vehicle black box including a radio communication unit; an RFID tag which is attached to a vehicle to identify the vehicle; a barricade bar which limits entrance of the vehicle; an RFID reader which is installed in a portion of the barricade bar and receives information from the RFID tag to determine whether or not the vehicle is authenticated to be parked; a motor driver which receives a signal from the RFID reader to drive the barricade bar to limit the vehicle entrance depending on the vehicle authentication; and a RF camera unit which picks up an image of a parking area where the vehicle is parked, and transmits the picked image to the black box.

Preferably, the barricade bar is vertically driven to limit the vehicle entrance and is vertically driven in a two stage to monitor the vehicle after the vehicle is parked, and an LED lamp is formed in a portion of the barricade bar.

Preferably, a solar cell system is installed on the top of the barricade bar to supply power to at least one of the RFID reader, the motor driver and the LED ramp, and the RF camera unit includes a camera and a RF communication part, and the RF communication part is a Bluetooth communication device or a Zigbee communication device.

The present invention can provide a parking barricade device which is capable of automatically and easily determining whether or not a vehicle is allowed to be parked and allowing or restricting vehicle parking based on the determination.

In addition, power efficiency can be raises by using the solar cell system, and the parking barricade device has a simple structure and can be easily and simply installed since the vehicle entrance is controlled only by vertical and linear motion of the barricade bar by simple motor driving.

Furthermore, the black box installed in the vehicle and the camera unit installed in the barricade bar can be used to provide high security performance to prevent a parked vehicle from being damaged and secure an evidence useful to catch a criminal afterhand.

DETAILED DESCRIPTION OF PREFERRED EMBODIMENTS

Figure 1:
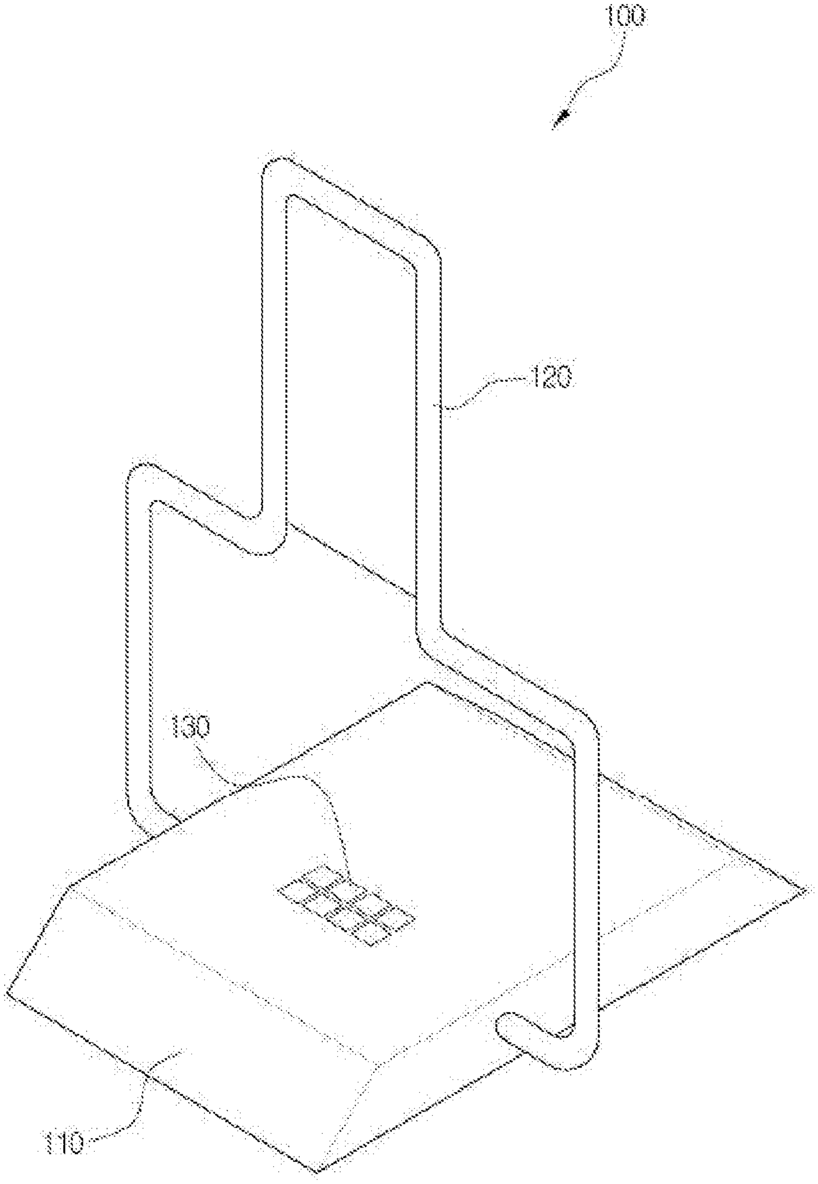
FIG. 1 is a perspective view of a conventional parking barricade.

The above and other objects, advantages, features and methods will be better understood when reading the following detailed description and the accompanying drawings. However, it should be understood that the present invention is not limited to the disclosed embodiments but may be embodied in other various forms. The disclosed embodiments are provided to describe the present invention in detail so that those skilled in the art can practice the technical ideas of the present invention.

In the drawings, elements of the embodiments are not shown in a limited sense but may be exaggerated for clarity. Throughout the drawings, same reference numerals denote same or similar elements.

In the specification, as used herein, the term "and/or" is meant to include at least one of elements arranged before and after. In addition, a singular form "a" or "an" is meant to include a plural form unless stated specifically otherwise. In addition, as used herein, the term "comprise(s)" or "comprising" is meant to include or add one or more of elements, steps, operations, devices and apparatuses other than those mentioned in the specification.

Hereinafter, preferred embodiments of the present invention will be described in detail with reference to the drawings.

Figure 2:
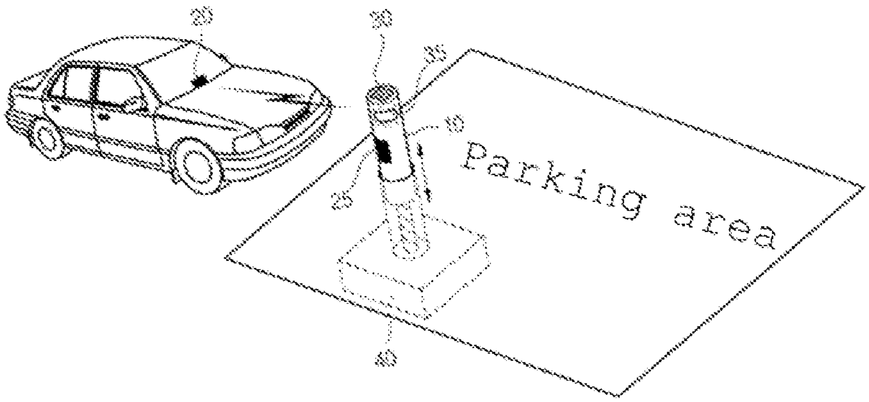
FIG. 2 is a schematic view showing configuration of a vehicle sensing parking barricade device according to an embodiment of the present invention.

FIG. 2 is a schematic view showing configuration of a vehicle sensing parking barricade device according to an embodiment of the present invention. Referring to FIG. 2, a vehicle sensing parking barricade device according to an embodiment of the present invention includes an RFID (Radio Frequency Identification) tag 20 which is attached to a vehicle for identifying the vehicle; a barricade bar 10 which limits entrance of the vehicle; an RFID reader 25 which is installed in a portion of the barricade bar 10 and receives information from the RFID tag 20 to determine whether or not the vehicle is authenticated to be parked; and a motor driver 40 which receives a signal from the RFID reader 25 to drive the barricade bar 10 to limit the vehicle entrance depending on the vehicle authentication.

With the above configuration, when the vehicle becomes close to the barricade by a predetermined distance, the RFIF reader 25 determines through an RF signal whether or not the vehicle is authorized to be parked. If it is determined that the vehicle is authorized to be parked, the barricade bar 10 which is usually erected to prevent entrance of vehicles is vertically descended to allow entrance of the authorized vehicle.

In more detail, for the purpose of allowing vehicles authorized to be parked in a parking area, the barricade bar 10 is installed in the central portion of the entrance of the parking are to allow the authorized vehicles to enter the parking area and the motor driver 40 is buried in the ground to vertically descend the barricade 10 to allow the authorized vehicles to enter the parking area.

The RFID tag 20 is attached to the interior or exterior of the vehicle to identify the vehicle and the RFID reader 25 is installed in the barricade bar 10 to read the RFID tag 20 to recognize the vehicle authorized to be parked. With an RFID system including the RFID tag 20 and the RFID reader 25 as configured above, when the vehicle attached with the RFID tag 20 approaches the parking area, the RFID reader 2 reads the RFID tag 20 to determine whether or not the vehicle is authorized to be parked. If it is determined that the vehicle is authorized to be parked, the RFID reader 25 sends a signal to the motor driver 40 buried under the barricade bar 10 to vertically descend the barricade bar 10 to allow the authorized vehicle to enter the parking area.

As used herein, RFID (Radio Frequency Identification), being also called "electronic tag," "smart tag" or "electronic label," is the next generation identification technique capable of tracking and managing information on the whole process ranging from production to sale of entities such as foods, animals, objects and so on through an IC chip and RF.

RFID can replace existing bar codes widely used for management of articles in the field of distribution. In general, an RFID system includes a tag which is attached to a product and contains information related to the whole process including production, distribution, storage and consumption of the product, and a reader which reads or decodes the information through an antenna incorporated therein.

An existing bar code system has low capacity, cannot keep track of information in real time and can read information only in a very near field (several cm). However, the RFID system can recognize information in a far field (several to several ten meters) and its RF reader can read data or information contained in RF tags attached to products a rate of several hundred RF tags per second. Because of such a merit, the RFID system is being used in toll gates providing a vehicle high pass service which automatically recognizes RFID to allow traffic pass and deferred payment.

The present invention suggests a device which is capable of determining whether or not a vehicle is allowed to be parked using simple equipment and capable of driving the barricade bar 10 to allow vehicle entrance or parking based on the determination.

As shown in FIG. 2, the vehicle sensing parking barricade device according to this embodiment further includes an LED lamp 35 provided in a particular portion of the barricade 10 to guide the vehicle to perceive the barricade at night, and a solar cell system 30 formed on the top of the barricade bar 10 to store power from the rays of the sun in the day time. The solar cell system 30 can raise power efficiency by supplying power to at least one of the LED ramp 3, the motor driver 40 and the RFID reader 25.

In addition, the barricade bar 10 is vertically driven by the motor driver 40 buried in the ground to allow the vehicle entrance. Such vertical driving can be achieved by engagement of an extended screw of the barricade bar 10 with a rotating screw of the motor driver 40. Alternatively, the vertical driving may be achieved by racks and pinions of the barricade bar 10 and the motor driver 40 which convert rotational motion into vertical motion. In this manner, the vehicle sensing parking barricade device of this embodiment can control the vehicle entrance through the barricade bar 10 which is in vertical and linearly moved by motor driving, with a simpler structure than that of conventional barricade devices, which facilitates installation of the vehicle sensing parking barricade device.

Figure 3:
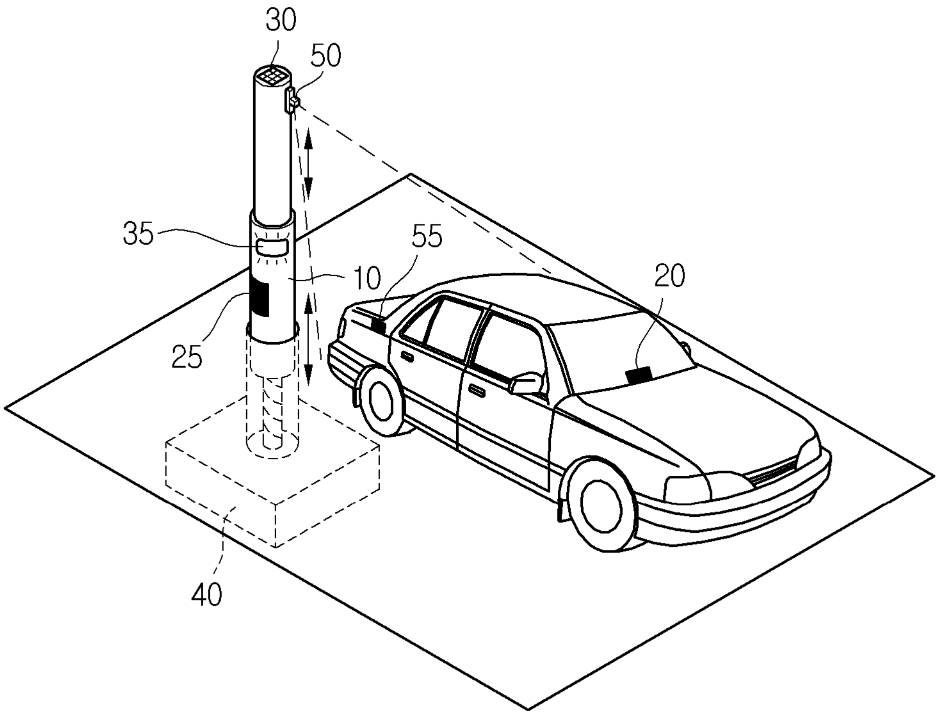
FIG. 3 is a schematic view showing configuration of a vehicle sensing parking barricade device with a vehicle security function according to another embodiment of the present invention.

FIG. 3 is a schematic view showing configuration of a vehicle sensing parking barricade device with a vehicle security function according to another embodiment of the present invention. Referring to FIG. 3, a parking barricade device of this embodiment includes a vehicle black box 55 including a radio communication unit; an RFID tag 20 which is attached to a vehicle to identify the vehicle; a barricade bar 10 which limits entrance of the vehicle; an RFID reader 25 which is installed in a portion of the barricade bar 10 and receives information from the RFID tag 20 to determine whether or not the vehicle is authenticated to be parked; a motor driver 40 which receives a signal from the RFID reader 25 to drive the barricade bar 10 to limit the vehicle entrance depending on the vehicle authentication; and a RF camera unit 50 which picks up an image of a parking area where the vehicle is parked, and transmits the picked image to the black box 55.

This embodiment has the same configuration as the embodiment shown in FIG. 2 in that the RFID system is used to identify a vehicle automatically and a vehicle authorized to be parked in a parking area is allowed to enter the park area. However, this embodiment is different from the embodiment of FIG. 2 in that the barricade bar 10 is again driven to be vertically ascended after the vehicle is parked, and a security function is provided which picks up an image of the parked vehicle by means of the radio camera unit 50 installed in the barricade bar 10.

In more detail, as shown in FIG. 3, the vehicle is provided with the RFID tag 20 and the vehicle black box 55 and the barricade bar 10 is provided with the RF camera unit 50. In order to identify the vehicle and allow the vehicle to enter the parking area, the barricade bar 10 is vertically descended, and, after the vehicle is parked, the barricade bar 10 is vertically ascended to be erected.

The camera unit 50 installed on the top of the barricade bar 10 is actuated to pick up an image of the parking area of the parked vehicle in real time and the picked image is transmitted to and stored in the black box provided in the vehicle in real time or periodically. The black box 55 is an accident data recorder which stores data related to traffic conditions of the vehicle, such as a vehicle speed, driver's voice and so on so that the cause of accidents can be found to prevent future possible accidents by analyzing the data afterhand. In this embodiment, the image obtained by the camera unit 50 provided in the barricade bar 10 can be received to and stored in the black box 55 through RF communication.

In this manner, in this embodiment, for the purpose of providing the security function to prevent the vehicle from being damaged or stolen by an outsider after the vehicle is parked, the camera unit 50 installed in the upper part of the erected barricade bar 10 picks up an image of the parking area of the vehicle and the picked image is transmitted to and stored in the black box 55 installed in the vehicle, so that the stored image can be used to prevent the vehicle from being damaged or stolen in the future and can utilized as an evidence useful to catch a criminal afterhand.

In addition, since the picked image is transmitted to the vehicle black box 55 through RF communication, the parking barricade device of this embodiment has an advantage of low production costs in that there is no need to install a separate storage and processor in the barricade bar 10 and a wireless local area network such as Bluetooth or Zigbee can be used.

In addition, data transmission may be periodically conducted to reduce the amount of data of the picked image. In addition to reduction of the amount of data by the periodical data transmission, periodical picked images can be sufficiently used to provide the monitoring and security for criminal situations such as damage and theft of vehicles which are not probably terminated in a short time.

Furthermore, the camera unit 50 needs to be elevated up in order to secure a wider imaging zone of the vehicle and the parking area. In this case, in this embodiment, the barricade bar 10 can be erected to be higher by driving it in a two or more stage, as shown in FIG. 3.

Although a few exemplary embodiments have been shown and described, it will be appreciated by those skilled in the art that adaptations and changes may be made in these exemplary embodiments without departing from the spirit and scope of the invention, the scope of which is defined in the appended claims and their equivalents.

What is claimed is:

1. A device for sensing parking barricade, the device comprising:
- a vehicle black box comprising a radio communication unit;
- a Radio Frequency Identification (RFID) tag attached to a vehicle to identify the vehicle;
- a barricade bar configured to limit an entrance of the vehicle;
- an RFID reader, installed in a portion of the barricade bar, configured to receive information from the RFID tag to determine whether or not the vehicle is authenticated to be parked;
- a motor driver configured to receive a signal from the RFID reader to drive the barricade bar to limit the vehicle entrance depending on the vehicle authentication; and
- an RF camera unit configured to pick up an image of a parking area where the vehicle is parked, and to transmit the picked image to the black box.

2. The device according to claim 1, wherein the barricade bar is vertically driven to limit the entrance of the vehicle and is vertically driven in a two stage to monitor the vehicle after the vehicle is parked.

3. The device according to claim 2, wherein an LED lamp is formed in a portion of the barricade bar.

4. The device according to claim 3, wherein a solar cell system is installed on a top of the barricade bar to supply power to at least one of the RFID reader, the motor driver and the LED lamp.

5. The device according to claim 4, wherein the RF camera unit comprises a camera and an RF communication part, and the RF communication part is a Bluetooth communication device or a Zigbee communication device.

6. The device according to claim 3, wherein the RF camera unit comprises a camera and an RF communication part, and the RF communication part is a Bluetooth communication device or a Zigbee communication device.

7. The device according to claim 2, wherein the RF camera unit comprises a camera and an RF communication part, and the RF communication part is a Bluetooth communication device or a Zigbee communication device.

8. The device according to claim 1, wherein the RF camera unit comprises a camera and an RF communication part, and the RF communication part is a Bluetooth communication device or a Zigbee communication device.

* * * * *